(12) United States Patent
Matsuda et al.

(10) Patent No.: US 12,227,101 B2
(45) Date of Patent: Feb. 18, 2025

(54) MANAGEMENT SYSTEM, MANAGEMENT PROGRAM, AND ELECTRIC VEHICLE

(71) Applicant: Panasonic Intellectual Property Management Co., Ltd., Osaka (JP)

(72) Inventors: Takashi Matsuda, Osaka (JP); Changhui Yang, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 523 days.

(21) Appl. No.: 17/632,259

(22) PCT Filed: Jul. 21, 2020

(86) PCT No.: PCT/JP2020/028183
§ 371 (c)(1),
(2) Date: Feb. 2, 2022

(87) PCT Pub. No.: WO2021/033481
PCT Pub. Date: Feb. 25, 2021

(65) Prior Publication Data
US 2022/0289065 A1   Sep. 15, 2022

(30) Foreign Application Priority Data
Aug. 21, 2019   (JP) ................ 2019-151183

(51) Int. Cl.
*B60L 53/68*   (2019.01)
*B60L 53/62*   (2019.01)
(Continued)

(52) U.S. Cl.
CPC ............... *B60L 53/68* (2019.02); *B60L 53/62* (2019.02); *B60L 53/65* (2019.02); *B60L 53/66* (2019.02);
(Continued)

(58) Field of Classification Search
CPC .......... B60L 53/68; B60L 53/67; B60L 53/62; B60L 53/66; B60L 53/65; B60L 53/80;
(Continued)

(56) References Cited

U.S. PATENT DOCUMENTS

| 2012/0038312 A1* | 2/2012 | Abe ..................... G01R 31/367 320/101 |
| 2013/0134778 A1* | 5/2013 | Tamanaha ................ H02J 7/04 307/10.1 |

(Continued)

FOREIGN PATENT DOCUMENTS

| JP | 2012-165599 | 8/2012 |
| JP | 2013-090360 | 5/2013 |

(Continued)

OTHER PUBLICATIONS

International Search Report of PCT application No. PCT/JP2020/028183 dated Sep. 29, 2020.

*Primary Examiner* — Alfonso Perez Borroto
(74) *Attorney, Agent, or Firm* — Rimon P.C.

(57) ABSTRACT

A charger information holding unit of a management system holds an identification information item and charging efficiencies of a plurality of chargers for charging an electric vehicle, the identification information item and the charging efficiencies being associated with each other. A communication unit of the management system receives an identification information item on a charger from an electric vehicle connected to the charger, via a network. A creating unit of the management system creates a charging plan for the electric vehicle, based on a required charging amount and a target charging termination time. The creating unit of the management system refers to the charger information holding unit and determines a charging efficiency of the charger connected to the electric vehicle, based on the received identification information item, and creates a charging plan (Continued)

with the charging efficiency of the charger. The communication unit of the management system transmits the created charging plan to the electric vehicle via the network.

12 Claims, 8 Drawing Sheets

(51) Int. Cl.
  *B60L 53/65* (2019.01)
  *B60L 53/66* (2019.01)
  *B60L 53/67* (2019.01)
  *H02J 7/00* (2006.01)
  *B60L 53/80* (2019.01)
  *H02P 27/06* (2006.01)

(52) U.S. Cl.
  CPC ............ *B60L 53/67* (2019.02); *H02J 7/0049* (2020.01); *H02J 7/0071* (2020.01); *H02J 7/00712* (2020.01); *B60L 53/80* (2019.02); *H02J 7/005* (2020.01); *H02P 27/06* (2013.01)

(58) Field of Classification Search
  CPC .... H02J 7/0049; H02J 7/00712; H02J 7/0071; H02J 7/005; H02P 27/06

USPC ........................................................ 307/10.1
  See application file for complete search history.

(56) References Cited

U.S. PATENT DOCUMENTS

| | | | |
|---|---|---|---|
| 2014/0062414 A1* | 3/2014 | Yuhara | H02J 7/345 320/134 |
| 2016/0003918 A1* | 1/2016 | Wada | G01R 31/374 320/134 |
| 2016/0031338 A1* | 2/2016 | Penilla | B60L 53/30 320/109 |
| 2016/0116547 A1* | 4/2016 | Hanyu | G01R 31/367 320/134 |
| 2017/0101025 A1* | 4/2017 | Penilla | G06Q 20/102 |
| 2017/0169648 A1* | 6/2017 | Penilla | B60L 53/68 |
| 2018/0111494 A1* | 4/2018 | Penilla | G06Q 20/145 |

FOREIGN PATENT DOCUMENTS

| | | |
|---|---|---|
| WO | 2013/160940 | 10/2013 |
| WO | 2015/151696 | 10/2015 |

* cited by examiner

MANAGEMENT SYSTEM, MANAGEMENT PROGRAM, AND ELECTRIC VEHICLE

CROSS-REFERENCE TO RELATED APPLICATIONS

This application is a U.S. national stage application of the PCT International Application No. PCT/JP2020/028183 filed on Jul. 21, 2020, which claims the benefit of foreign priority of Japanese patent application No. 2019-151183 filed on Aug. 21, 2019, the contents all of which are incorporated herein by reference.

TECHNICAL FIELD

The present invention relates to a management system that manages an electric vehicle and a charger, a management program, and an electric vehicle.

BACKGROUND ART

In recent years, electric vehicles (EVs) and plug-in hybrid vehicles (PHVs) have become widespread. These electric vehicles and hybrid vehicles are equipped with secondary batteries, which are a key device. To suppress the degradation of a secondary battery to give it a longer service life, proper management of charging/discharging of the secondary battery is essential.

For example, a method has been proposed, by which a degradation table, which is determined based on a use history of a secondary battery, and a charging/discharging plan, which is created based on a demand forecast or the like, are transmitted from a server to a controller of the secondary battery to suppress the degradation of the secondary battery (see, e.g., PTL 1).

CITATION LIST

Patent Literature

PTL 1: WO 2015/151696

SUMMARY OF THE INVENTION

The above method, however, does not apply to an assumed case where the battery is charged by a plurality of chargers with different characteristics. Besides, because the degradation table is transmitted to the controller, updating the table structure, such as adding temperature characteristics to the degradation table, requires updating of software running on the controller.

The present disclosure has been made in view of the above circumstances, and it is therefore an object of the disclosure to provide a technique for creating a highly accurate charging plan that, while being easily put into practical use, contributes to suppression of degradation.

In order to solve the above problems, a management system according to an aspect of the present disclosure includes: a charger information holding unit that holds an identification information item and a charging efficiency of each of a plurality of chargers, the identification information item and the charging efficiency being associated with each other; a communication unit that, from an electric vehicle connected to a charger that is one of the chargers, receives an identification information item on the charger via a network; and a creating unit that creates a charging plan for the electric vehicle, based on a required charging amount and a target charging termination time. The creating unit refers to the charger information holding unit and determines a charging efficiency of the charger connected to the electric vehicle, based on the received identification information item, and creates a charging plan with the charging efficiency of the charger. The communication unit sends the created charging plan to the electric vehicle via the network.

Any combination of the constituent elements described above and modifications of expressions of the present disclosure in terms of method, device, system, computer program, and the like are still valid as other aspects of the present disclosure.

According to the present disclosure, a highly accurate charging plan that, while being easily put into practical use, contributes to suppression of degradation can be created.

DESCRIPTION OF EMBODIMENT

Figure 1:
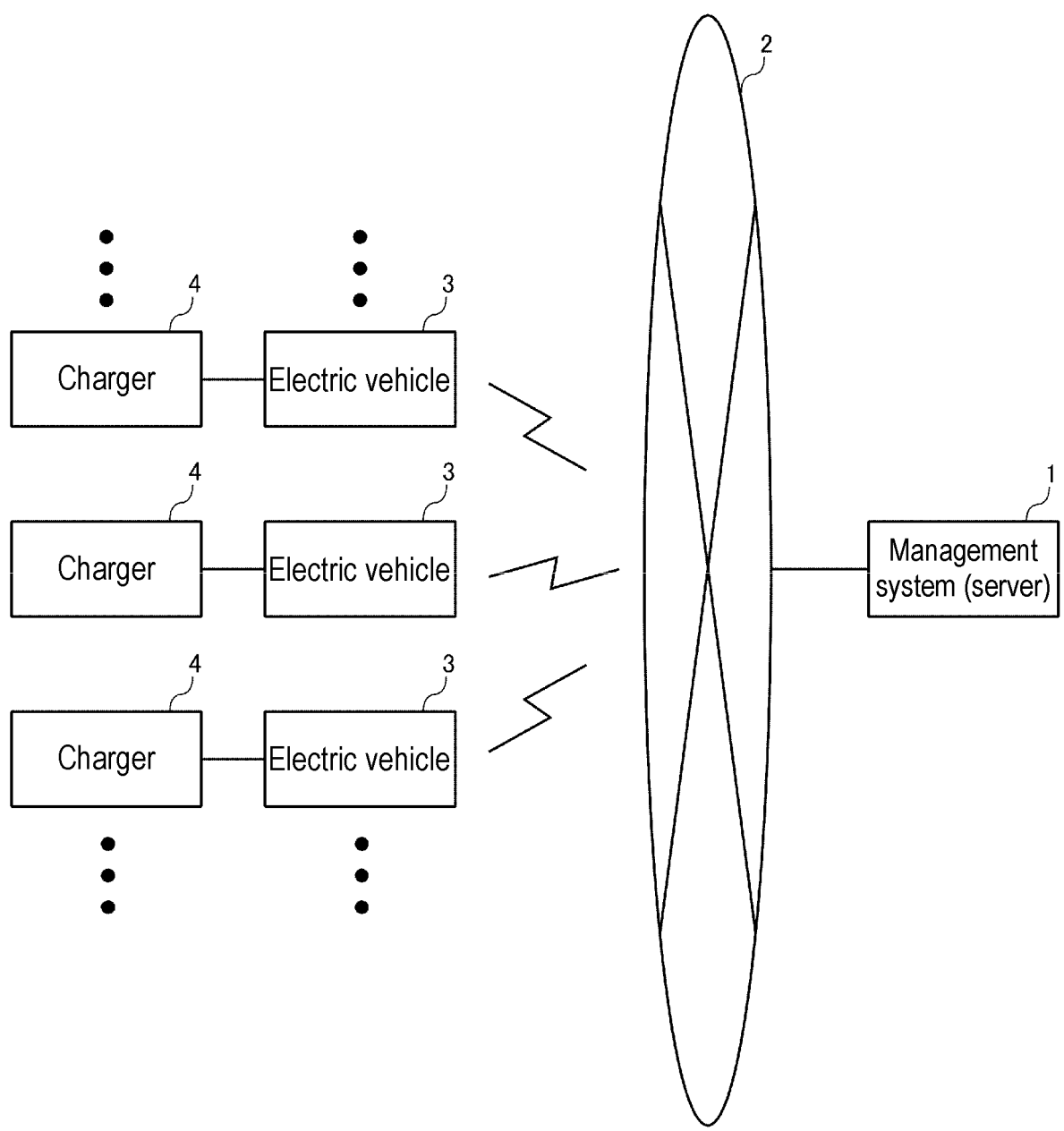
FIG. 1 is an explanatory diagram of a management system according to an exemplary embodiment.

FIG. 1 is an explanatory diagram of management system 1 according to an exemplary embodiment. Management system 1 is a system that manages information of a plurality of electric vehicles 3 and information of a plurality of chargers 4 and that when charger 4 charges up cells of electric vehicle 3, creates a charging plan that contributes to suppression of degradation of the cells. Management system 1 is a system that is used in delivery companies, bus companies, taxi companies, and the like. Hereinafter, this exemplary embodiment will be described on the assumption that management system 1 is used in a delivery company. The delivery company owns a plurality of electric vehicles 3 that can be used for load transportation. In this exemplary embodiment, electric vehicle 3 is assumed to be a pure electric vehicle (EV) equipped with no internal combustion engine. The plurality of chargers 4 are not limited to chargers installed in offices or warehouses of the delivery company, but include also chargers installed in various facilities in a delivery area. For example, chargers installed in public facilities, commercial facilities, gas stations, car dealer shops, and freeway service areas are also put under management by the system.

The plurality of electric vehicles 3 each have a wireless communication function, and are accessible to network 2 to which management system 1 is connected. Network 2 is a general term for such communication paths as the Internet and leased lines, and types of communication media and protocols involved in network 2 are not matter of concern. As the communication media, for example, a mobile phone network (cellular network), a wireless local area network (LAN), a wired LAN, an optical fiber network, an ADSL network, a CATV network, or the like can be used. As the communication protocols, for example, the transmission control protocol (TCP)/internet protocol (IP), the user datagram protocol (UDP)/IP, or the like can be used.

Figure 2:
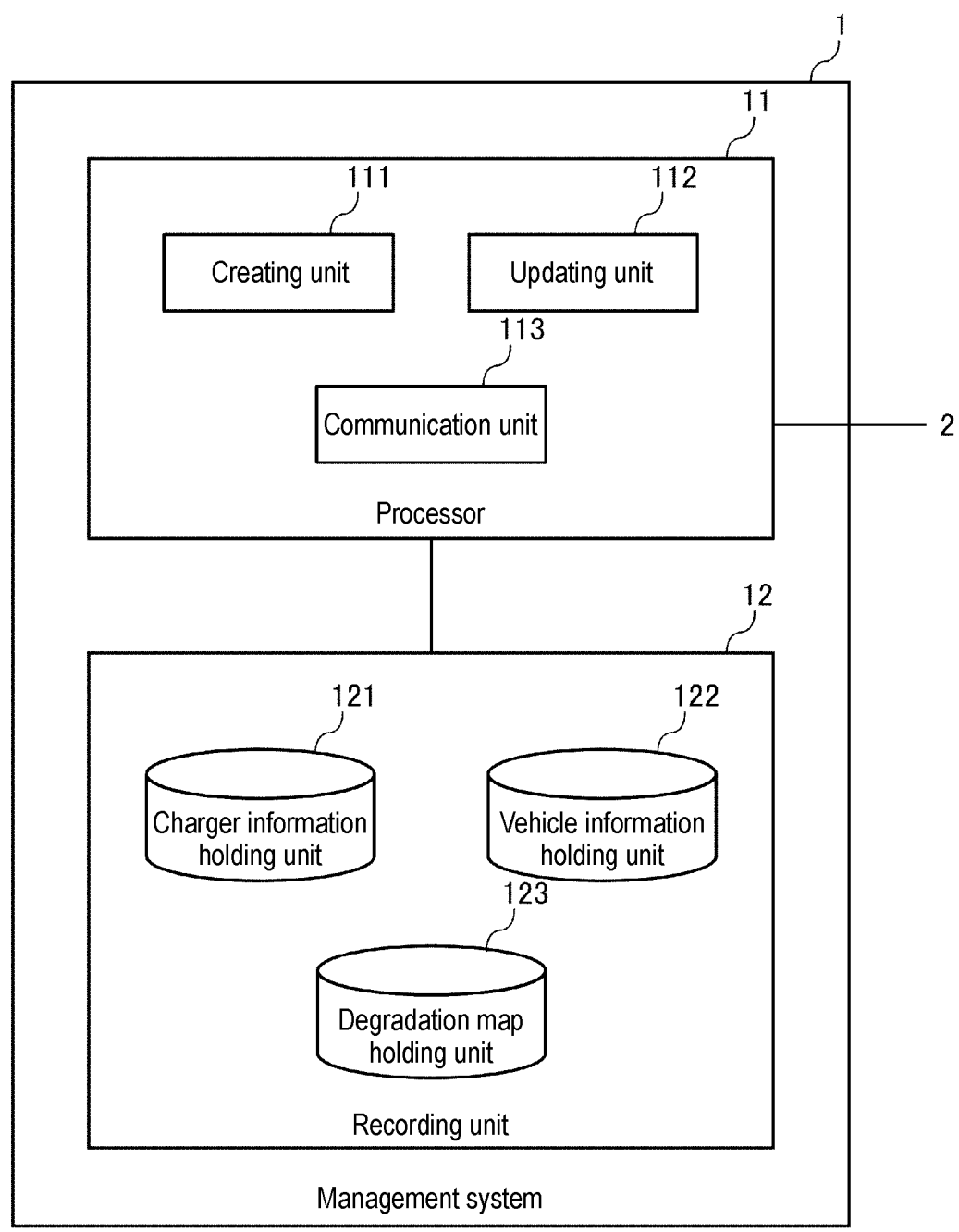
FIG. 2 depicts a configuration example of the management system according to the exemplary embodiment.

FIG. 2 depicts a configuration example of management system 1 according to the exemplary embodiment. Management system 1 is composed of a cloud server installed in a data center. Management system 1 may be composed of the delivery companies' server. Management system 1 includes processor 11 and recording unit 12. Processor 11 includes creating unit 111, updating unit 112, and communication unit 113. The function of processor 11 is implemented by hardware resources and software resources that work together or by hardware resources alone. Usable hardware resources include, a central processing unit (CPU), a graphics processing unit (GPU), a read only memory (ROM), a random access memory (RAM), an application specific integrated circuit (ASIC), a field programmable gate array (FPGA), and other large-scale integrated circuits (LSIs). Usable software resources include an operating system, and other programs including an application program.

Recording unit 12 includes charger information holding unit 121, vehicle information holding unit 122, and degradation map holding unit 123. Recording unit 12 includes a nonvolatile recording medium, such as a hard disk drive (HDD) and a solid state drive (SSD), and records various programs and data.

Charger information holding unit 121 holds an identification information item and a charging efficiency of each of a plurality of chargers 4 to be managed, the identification information item and the charging efficiency being associated with each other. Charger information holding unit 121 may further hold information on the type numbers, installation locations, and the like of chargers 4. As a charging efficiency initial value of each charger 4, an initial value listed in a specification table may be entered or the initial value may be left null. For a case of charger 4 whose specifications are unknown, its charge efficiency initial value is left null.

Vehicle information holding unit 122 holds an identification information item and a charging efficiency of each of a plurality of electric vehicles 3 to be managed, the identification information item and a charge efficiency being associated with each other. Vehicle information holding unit 122 may further hold information on the types, total traveling distances, discharging efficiencies, and the likes of electric vehicles 3. As a charging efficiency initial value and a discharging efficiency initial value of each electric vehicle 3, initial values listed in the specification table may be entered or both initial values may be left null.

The charging efficiency of charger 4, the charging efficiency of electric vehicle 3, and the discharging efficiency of electric vehicle 3 decrease due to time degradation. It should be noted that chargers 4 with the same type number show different charging efficiency decrease curves, depending on individual differences, environmental conditions, service modes, and the like. Similarly, electric vehicles 3 of the same type show different charging efficiency decrease curves or discharging efficiency decrease curves, depending on individual differences, environmental conditions, service modes, and the like. The heavier the decrease of the charging efficiency or the discharging efficiency, the greater the charging loss or discharging loss, thereby increasing the heat generation.

Degradation map holding unit 123 holds a charge cycle degradation characteristic map, a discharge cycle degradation map, and a storage degradation characteristic map for each type of secondary battery. Cycle degradation is degradation that progresses as the number of times of charging/discharging increases. Cycle degradation occurs mainly because of cracking or peeling resulting from expansion or contraction of an active material. Cycle degradation depends on a state of charge (SOC) range, a temperature, and a current rate that are used. In general, cycle degradation accelerates as the SOC range used gets wider, the temperature used gets higher, or the current rate used gets higher.

Storage degradation is deterioration that progresses as time goes by, depending on the temperature of a secondary battery at each point of time and the SOC of the same at each point of time. Storage degradation progresses as time goes by, regardless of whether a charging process or discharging process is in progress. Storage degradation occurs mainly because of formation of a film (solid electrolyte interphase (SEI) film) on the negative electrode. Storage degradation depends on the SOC and the temperature at each point of time. In general, storage degradation accelerates as the SOC at each point of time gets higher or the temperature at each point of time gets higher.

A cycle degradation rate and a storage degradation rate are derived in advance for each type of secondary battery, by battery manufacturer's experiments or simulations.

Figure 3:
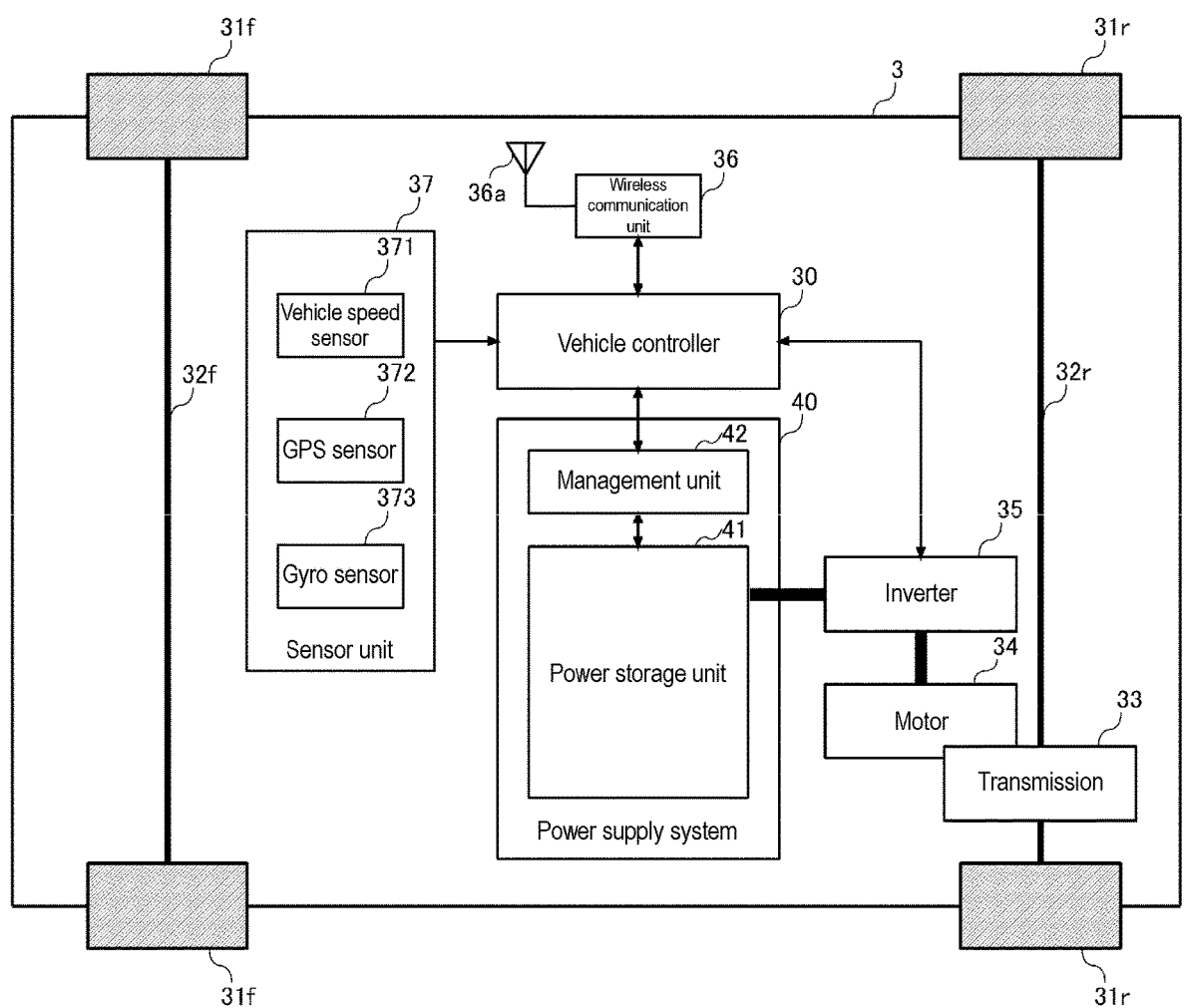
FIG. 3 depicts a schematic configuration of an electric vehicle.

FIG. 3 depicts a schematic configuration of electric vehicle 3. Electric vehicle 3 shown in FIG. 3 is a rear-wheel drive (2WD) EV including a pair of front wheels 31*f*, a pair of rear wheels 31*r*, and motor 34 serving as a power supply. The pair of front wheels 31*f* are connected by front wheel axle 32*f*, while the pair of rear wheels 31*r* are connected by rear wheel axle 32*r*. Transmission 33 transmits the rotation of motor 34 to rear wheel axle 32*r* at a given conversion ratio.

Vehicle controller 30 is a vehicle electronic control unit (ECU) that controls electric vehicle 3 as a whole, and may be composed of, for example, an integrated vehicle control module (VCM). Vehicle controller 30 acquires various pieces of sensor information for detecting behavior of electric vehicle 3 and/or a surrounding environment of electric vehicle 3, from sensor unit 37 in electric vehicle 3.

Sensor unit 37 is a general term for sensors incorporated in electric vehicle 3. FIG. 3 shows, as typical sensors, vehicle speed sensor 371, global positioning system (GPS) sensor 372, and gyro sensor 373.

Vehicle speed sensor 371 generates a pulse signal proportional to the rotating speed of front wheel axle 32*f* or rear wheel axle 32*r*, and transmits the generated pulse signal to vehicle controller 30. Vehicle controller 30 detects the speed of electric vehicle 3, based on the pulse signal received from vehicle speed sensor 371.

GPS sensor 372 detects positional information on electric vehicle 3, and transmits the detected positional information to vehicle controller 30. Specifically, GPS sensor 372 receives a plurality radio waves from a plurality of GPS satellites, the radio waves including respective times of transmission of the radio waves, and calculates the latitude and longitude of a reception point, based on the times of transmission included respectively in the received radio waves.

Gyro sensor 373 detects the angular velocity of electric vehicle 3, and transmits the detected angular velocity to vehicle controller 30. Vehicle controller 30 integrates the incoming angular velocity from gyro sensor 373, thus being able to determine a tilt angle of electric vehicle 3.

In addition to these sensors, electric vehicle 3 is further equipped with various sensors. For example, electric vehicle 3 is equipped with an accelerator pedal opening sensor, a brake pedal opening sensor, a steering angle sensor, a camera, a sonar, and the like.

Wireless communication unit 36 carries out signal processing for making wireless access to network 2 via antenna 36a. Usable wireless communication networks that allow electric vehicle 3 to wirelessly access network 2 include, for example, a mobile phone network (cellular network), a wireless LAN, an electronic toll collection system (ETC), a dedicated short range communications (DSRC) system, a vehicle-to-infrastructure (V2I) system, and a vehicle-to-vehicle (V2V) system.

Figure 4:
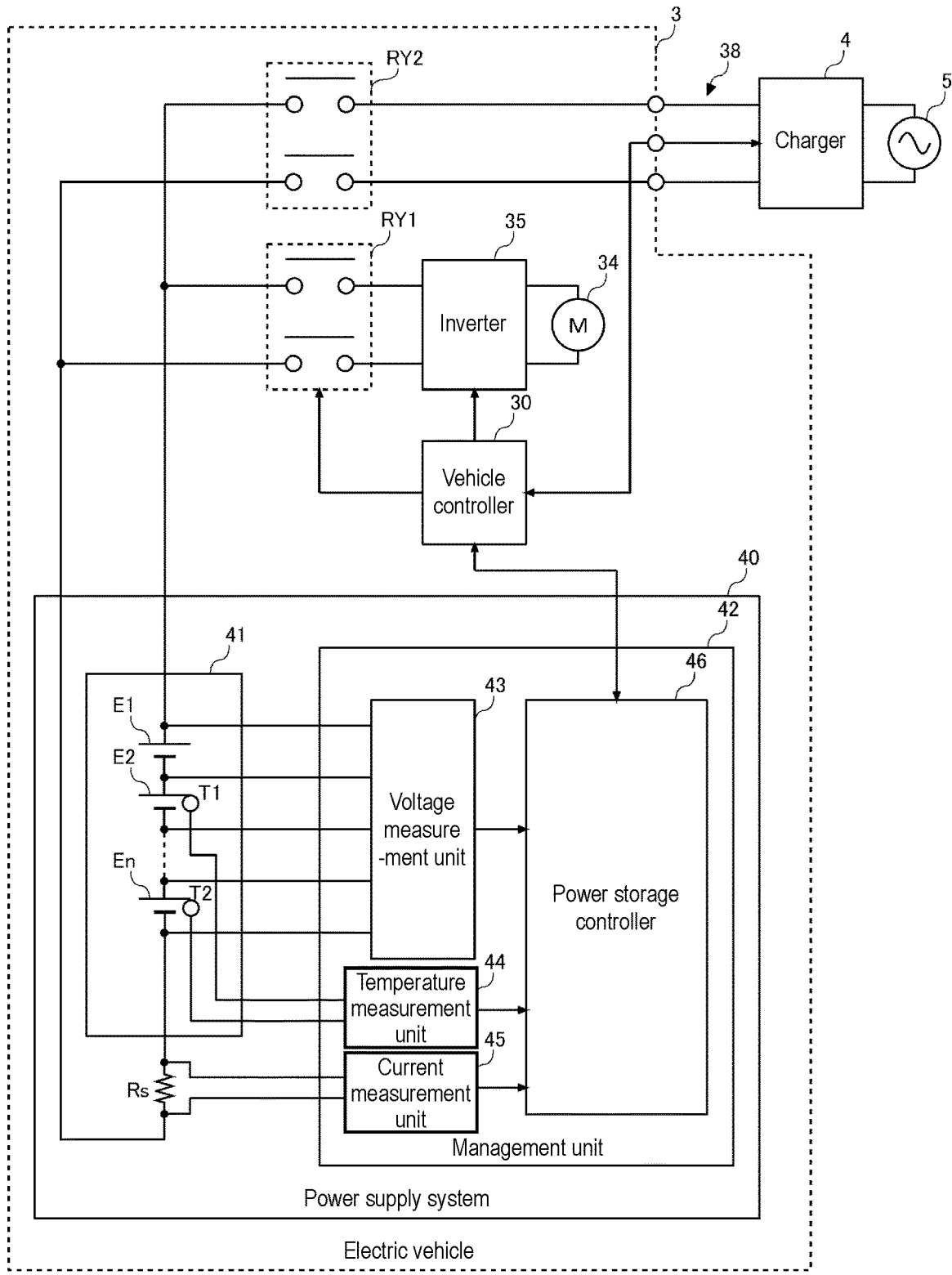
FIG. 4 is an explanatory diagram of a detailed configuration of a power supply system incorporated in the electric vehicle shown in FIG. 3.

FIG. 4 is an explanatory diagram of a detailed configuration of power supply system 40 incorporated in electric vehicle 3 shown in FIG. 3. Power supply system 40 is connected to motor 34 via first relay RY1 and inverter 35. In power running mode, inverter 35 converts DC power, which is supplied from power supply system 40, into AC power, and supplies the AC power to motor 34. In regeneration mode, inverter 35 converts AC power, which is supplied from motor 34, into DC power, and supplies the DC power to power supply system 40. Motor 34 is a three-phase AC motor. In power running mode, it rotates in accordance with AC power supplied from inverter 35. In regeneration mode, motor 34 converts rotation energy created by deceleration into AC power, and supplies the AC power to inverter 35.

First relay RY1 is a contactor inserted in a line connecting power supply system 40 to inverter 35. When electric vehicle 3 is traveling, vehicle controller 30 sets first relay RY1 in an on-state (closed state), thus electrically connecting power supply system 40 to power equipment of electric vehicle 3. When electric vehicle 3 is not traveling, vehicle controller 30, in principle, sets first relay RY1 in an off-state (open state), thus breaking the electrical connection between power supply system 40 and the power equipment of electric vehicle 3. In place of the relay, a non-relay type switch, such as a semiconductor switch, may be used.

Electric vehicle 3 is connected to charger 4 via charging cable 38. This allows power storage unit 41 in power supply system 40 to be charged from the outside. In this exemplary embodiment, charger 4 is assumed to be a quick charger having a power conversion function of converting three-phase AC power, which is supplied from commercial power system 5, into DC power. Charger 4 generates DC power by full-wave rectifying AC power supplied from commercial power system 5 and further smoothing the rectified AC power through a filter.

Usable quick charging standards include, for example, CHAdeMO (registered trademark), GB/T, and combined charging system (Combo). As of 2019, CHAdeMO (registered trademark) defines maximum power output (specification) as 1000 V×400 A=400 kW. GB/T defines maximum power output (specification) as 750 V×250 A=185 kW. Combo defines maximum power output (specification) as 900 V×400 A=350 kW. CHAdeMO (registered trademark) and GB/T adopt a controller area network (CAN) as a standard communication method. Combo, on the other hand, adopts power line communication (PLC) as a standard communication method.

Charging cable 38 conforming to the CAN method includes a communication line as well as a power line. When a charging port of electric vehicle 3 is connected to charger 4 through charging cable 38, vehicle controller 30 establishes a communication channel for communicating with a controller in charger 4. In a case of a charging cable conforming to the PLC method, a communication signal is superposed on a signal transmitted through the power line, and is exchanged between vehicle controller 30 and the controller in charger 4.

Between vehicle controller 30 and management unit 42 of power supply system 40, a communication channel is established through an in-vehicle network (e.g., CAN). A communication protocol applied between vehicle controller 30 and the controller in charger 4 and a communication protocol applied between vehicle controller 30 and management unit 42 of power supply system 40 may be the same or different from each other. When these communication protocols are different from each other, vehicle controller 30 functions as a gateway.

In electric vehicle 3, second relay RY2 is inserted in a line connecting power supply system 40 to charger 4. In place of the relay, a non-relay type switch, such as a semiconductor switch, may be used. When charger 4 charges power storage unit 41, vehicle controller 30 and management unit 42 operate in cooperation with each other. Vehicle controller 30 and management unit 42 set second relay RY2 in an on-state (closed state) before charger 4 starts charging, and sets second relay RY2 in an off-state (open state) after charger 4 finishes charging.

When charger 4 is an ordinary charger, in general, it charges with single-phase AC power of 100 V/200 V. When charger 4 charges with AC power, AC power is converted into DC power by an AC/DC converter (not illustrated) interposed between second relay RY2 and power supply system 40.

Power supply system 40 includes power storage unit 41 and management unit 42, and power storage unit 41 includes a plurality of cells E1-En connected in series. Power storage unit 41 may be made up of a plurality of power storage modules that are connected in series or connected in series and parallel with each other. The cells are provided as lithium ion battery cells, nickel hydride battery cells, lead battery cells, electric double-layer capacitor cells, lithium ion capacitor cells, or the like. Hereinafter, in this specification, a case of using lithium ion battery cells (with a nominal voltage ranging from 3.6 V to 3.7 V) is assumed. The number of cells E1-En connected in series is determined according to the drive voltage of motor 34.

Shunt resistor Rs is connected in series to the plurality of cells E1-En. Shunt resistor Rs functions as a current detection element. A Hall element may be used in place of shunt resistor Rs. A plurality of temperature sensors T1, T2, which detect temperatures of the plurality of cells E1-En, are disposed in power storage unit 41. One temperature sensor may be disposed for each battery module or for each of the plurality of cells. As temperature sensors T1, T2, for example, thermistors can be used.

Management unit 42 includes voltage measurement unit 43, temperature measurement unit 44, current measurement unit 45, and power storage controller 46. Nodes of the plurality of cells E1-En connected in series are connected to voltage measurement unit 43 via a plurality of voltage lines, respectively. Voltage measurement unit 43 measures respective voltages between pairs of adjacent voltage lines, thereby measuring respective voltages between pairs of adjacent cells of cells E1-En. Voltage measurement unit 43 transmits the measured voltages between pairs of adjacent cells of cells E1-En to power storage controller 46.

Because voltage measurement unit 43 has a higher voltage than power storage controller 46, voltage measurement unit 43 is connected to power storage controller 46 through a communication line which is kept insulated in the section between voltage measurement unit 43 and power storage controller 46. Voltage measurement unit 43 may be configured using an ASIC or a general-purpose analog front-end IC. Voltage measurement unit 43 includes a multiplexer and an A/D converter. The multiplexer outputs respective voltages between pairs of adjacent voltage lines to the A/D converter in order, with a voltage between the top pair of voltage lines first. The A/D converter converts an incoming analog voltage from the multiplexer, into a digital value.

Temperature measurement unit 44 includes voltage dividing resistors and an A/D converter. The A/D converter converts a plurality of analog voltages, which are created by dividing voltage signals from the plurality of temperature sensors T1, T2 by the plurality of voltage dividing resistors, into digital values in sequence, and outputs the digital values to power storage controller 46. Based on the incoming digital values, power storage controller 46 estimates the temperatures of the plurality of cells E1-En. For example, power storage controller 46 estimates the temperature of each of cells E1-En, based on a temperature value measured by a temperature sensor that is closest to each of cells E1-En.

Current measurement unit 45 includes a differential amplifier and an A/D converter. The differential amplifier amplifies a voltage across shunt resistor Rs, and outputs the amplified voltage to the A/D converter. The A/D converter converts the incoming voltage from the differential amplifier into a digital value, and outputs the digital value to power storage controller 46. Based on the digital value, power storage controller 46 estimates a current flowing through the plurality of cells E1-En.

When power storage controller 46 has a built-in A/D converter and is provided with an analog input port, temperature measurement unit 44 and current measurement unit 45 may output analog voltages to power storage controller 46, in which the A/D converter in power storage controller 46 may convert the analog voltages into digital values.

Power storage controller 46 manages states of the plurality of cells E1-En, based on the voltages, the temperatures, and the currents of the plurality of cells E1-En that are measured by voltage measurement unit 43, temperature measurement unit 44, and current measurement unit 45, respectively. Power storage controller 46 and vehicle controller 30 are connected through the in-vehicle network. As the in-vehicle network, for example, a CAN or a local interconnect network (LIN) can be used.

Power storage controller 46 can be configured using a microcomputer, a nonvolatile memory (e.g., electrically erasable programmable read-only memory (EEPROM), and a flash memory). Power storage controller 46 estimates an SOC and a state of health (SOH) of each of the plurality of cells E1-En.

Power storage controller 46 estimates the SOC by a combination of an open circuit voltage (OCV) method and a current integration method. The OCV method is a method by which the SOC is estimated based on an OCV of each of cells E1-En measured by voltage measurement unit 43 and on an SOC-OCV curve. The current integration method is a method by which the SOC is estimated based on an OCV of each of cells E1-En at the start of charging/discharging and on a current integration value measured by current measurement unit 45. The current integration method has a drawback that as a charging/discharging time gets longer, measurement errors by current measurement unit 45 further accumulate. It is therefore necessary to correct an SOC estimated by the current integration method, by using an SOC estimated by the OCV method.

The SOH is defined as a ratio of a current full charge capacity (FCC) to an initial FCC, and a lower SOH value (value closer to 0%) indicates the further progress of degradation. The SOH may be determined by capacity measurement through full charging/discharging or by adding up a storage degradation measurement and a cycle degradation measurement.

In addition, the SOH may be estimated based on a correlation between a cell and its internal resistance. The internal resistance can be estimated by dividing a voltage drop caused by a given current flowing through the cell for a given time by the value of that current. The internal resistance decreases as the cell temperature rises, and increases as the SOH decreases.

Before electric vehicle 3 is charged, creating unit 111 of management system 1 creates a charging plan, based on the current SOC of electric vehicle 3 and on a delivery plan. The delivery plan is basically created on the night before the date of delivery. Communication unit 113 can receive the current SOC of electric vehicle 3 from electric vehicle 3. Based on a delivery route for electric vehicle 3 to be charged, creating unit 111 estimates a traveling distance needed for tomorrow's delivery, and estimates an amount of power required for tomorrow's delivery. Creating unit 111 sets a value given by adding the amount of power required for tomorrow's delivery to a lower limit value of an SOC use range, as a charging target SOC. Creating unit 111 calculates a required charging amount, based on a difference between the target charging SOC and the current SOC. Creating unit 111 sets a time right before a departure time fixed in the delivery plan, as a target charging completion time. For example, when the departure time is scheduled for 9:00, the target charging completion time is set as 8:55.

As described above, to suppress storage degradation of the secondary battery, reducing a period in which the SOC remains high is effective. Reaching the target SOC right before the start of use of the secondary battery is therefore desirable. In addition, to suppress cycle degradation of the secondary battery at the time of charging, charging the secondary battery at a lower current rate is effective. Charging the secondary battery with a low current suppresses its heat generation, thus suppressing a rise in the temperature of the secondary battery. The rising temperature leads to acceleration of both storage degradation and cycle degradation.

Creating unit 111 creates a charging plan that contributes to suppression of degradation of the secondary battery, based on the required charging amount and the target charging completion time. Various charging methods can be used in the charging plan. As the simplest charging method, a method of charging with a constant current (CC), i.e., CC method, can be used. Specifically, the required charging amount is divided by a time span between a charging start time and the target charging completion time to calculate a current rate, and the battery is charged with the calculated current rate. A CC-CV method may also be employed, according to which constant current (CC) charging is started as an initial charging process, and when a voltage value lower than the voltage corresponding to the target SOC by a given value is reached, the constant current (CC) charging is switched to constant voltage (CV) charging. Another charging method may also be employed, according to which, to keep the SOC as low as possible, an initial current rate is set low, and then the current rate is increased step by step as the target charge completion time comes near.

Creating unit 111 may derive an optimum current rate according to the type of the secondary battery and an ambient temperature by referring to the charge cycle degradation characteristic map and the storage degradation characteristic map that are held in degradation map holding unit 123. In addition, a pause period may be set in the middle of a charging process. In this manner, various algorithms can be used as charging methods. Any algorithm that contributes to suppression of degradation of the secondary battery and allows reaching the target SOC at the target charge completion time may be used as a charging method.

The above-described methods of creating the charging plan are implemented on the assumption that charging is carried out before the start of delivery. In some cases, however, charging in the middle of delivery becomes necessary. There is a case, for example, where the delivery route is changed and the traveling distance is increased on the day of delivery. In such a case, it is necessary to charge the battery, using charger 4 installed in a place other than the office or the warehouse. Quick charging is often carried out in this situation. Quick charging involves a higher current rate, thus increasing load on the secondary battery.

Creating unit 111 creates a charging plan, based on the current SOC of electric vehicle 3 and on a delivery plan on delivery work of the current time onward of the day. Based on the remaining delivery route of electric vehicle 3, creating unit 111 estimates a traveling distance needed for the remaining delivery and estimates an amount of power required for the remaining delivery. Creating unit 111 sets a value given by adding the amount of power required for the remaining delivery to the lower limit value of the SOC use range, as a charging target SOC. Creating unit 111 calculates a required charging amount, based on a difference between the target charging SOC and the current SOC.

Creating unit 111 estimates a remaining traveling time, based on the traveling distance needed for the remaining delivery route and on an average speed of electric vehicle 3. Creating unit 111 adds a time required for delivery or loading to the remaining traveling time to estimate a remaining work time. Creating unit 111 subtracts the remaining work time from a scheduled time of returning to the office, thereby setting a target charging completion time for charger 4. Creating unit 111 creates a charging plan that contributes to suppression of degradation of the secondary battery, based on the required charging amount and the target charging completion time. A charging method using an algorithm suitable for quick charging can be used.

When a charging plan is created, a charging efficiency of charger 4 needs to be taken into consideration. Charging the battery by charger 4 with a low charging efficiency results in a case where charging is not completed before the target charging completion time. A charging efficiency of electric vehicle 3 must also be taken into consideration. Charging electric vehicle 3 with a low charging efficiency also results in a case where charging is not completed before the target charging completion time.

When a charging plan is created, a discharging efficiency of electric vehicle 3 needs to be taken into consideration. A low discharging efficiency of electric vehicle 3 leads to a case where electric vehicle 3 is unable to travel a scheduled distance even if the secondary battery secures an estimated required amount of power.

Figure 5:
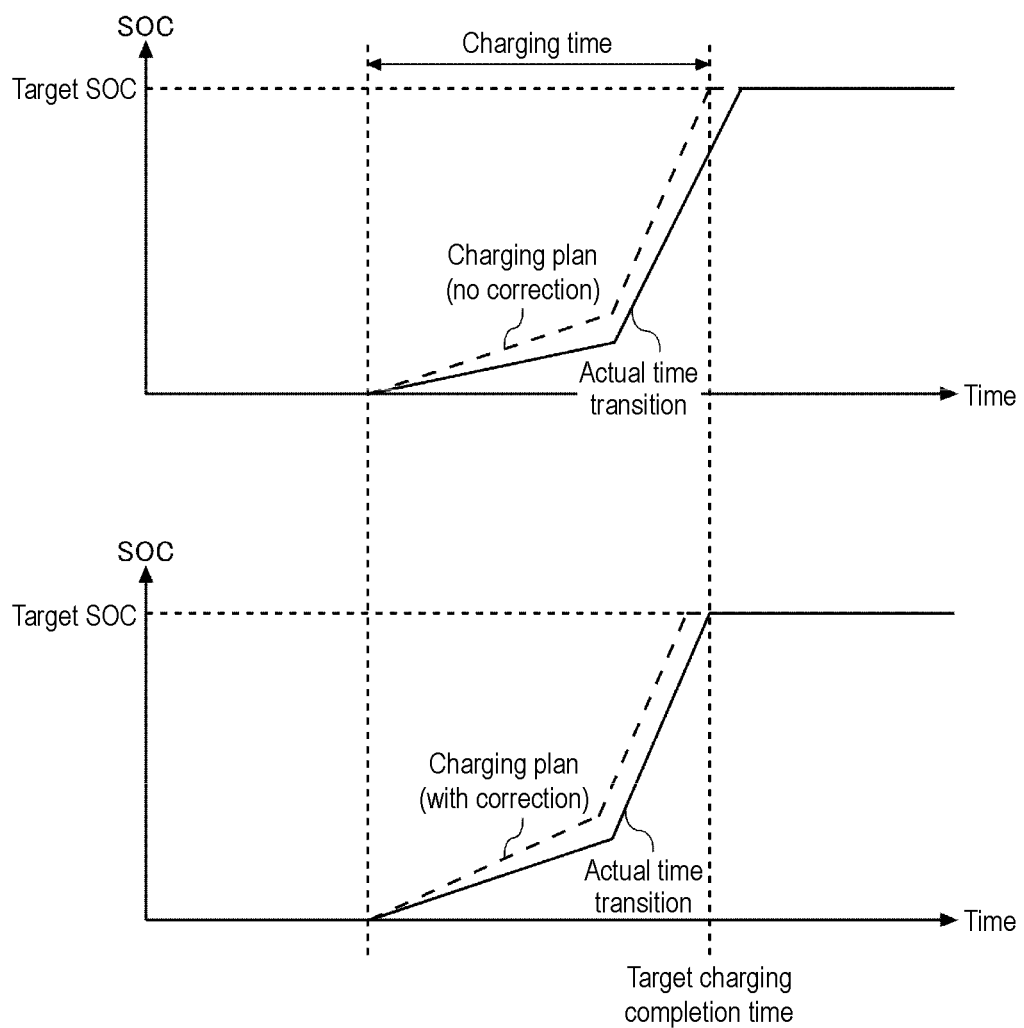
FIG. 5 is a diagram that compares time transition of a state of charge (SOC) based on a charge plan with time transition of an SOC at the time of actual charging.

FIG. 5 is a diagram that compares time transition of an SOC based on a charging plan with time transition of an SOC at the time of actual charging. A graph on the upper side shows an example without the charging efficiency of charger 4 and of electric vehicle 3. In this example, charging in accordance with the charging plan results in a failure in reaching the target SOC before the target charging completion time. A graph on the lower side shows an example in which the charging plan is corrected with the charging efficiency of charger 4 and of electric vehicle 3 into consideration. In this example, the charging plan is corrected according to the charging efficiency of charger 4. Specifically, the current rate is corrected according to the charging efficiency of charger 4 and to the charging efficiency of electric vehicle 3. Charging in accordance with the corrected charging plan results in a success in reaching the target SOC before the target charging completion time.

Figure 6:
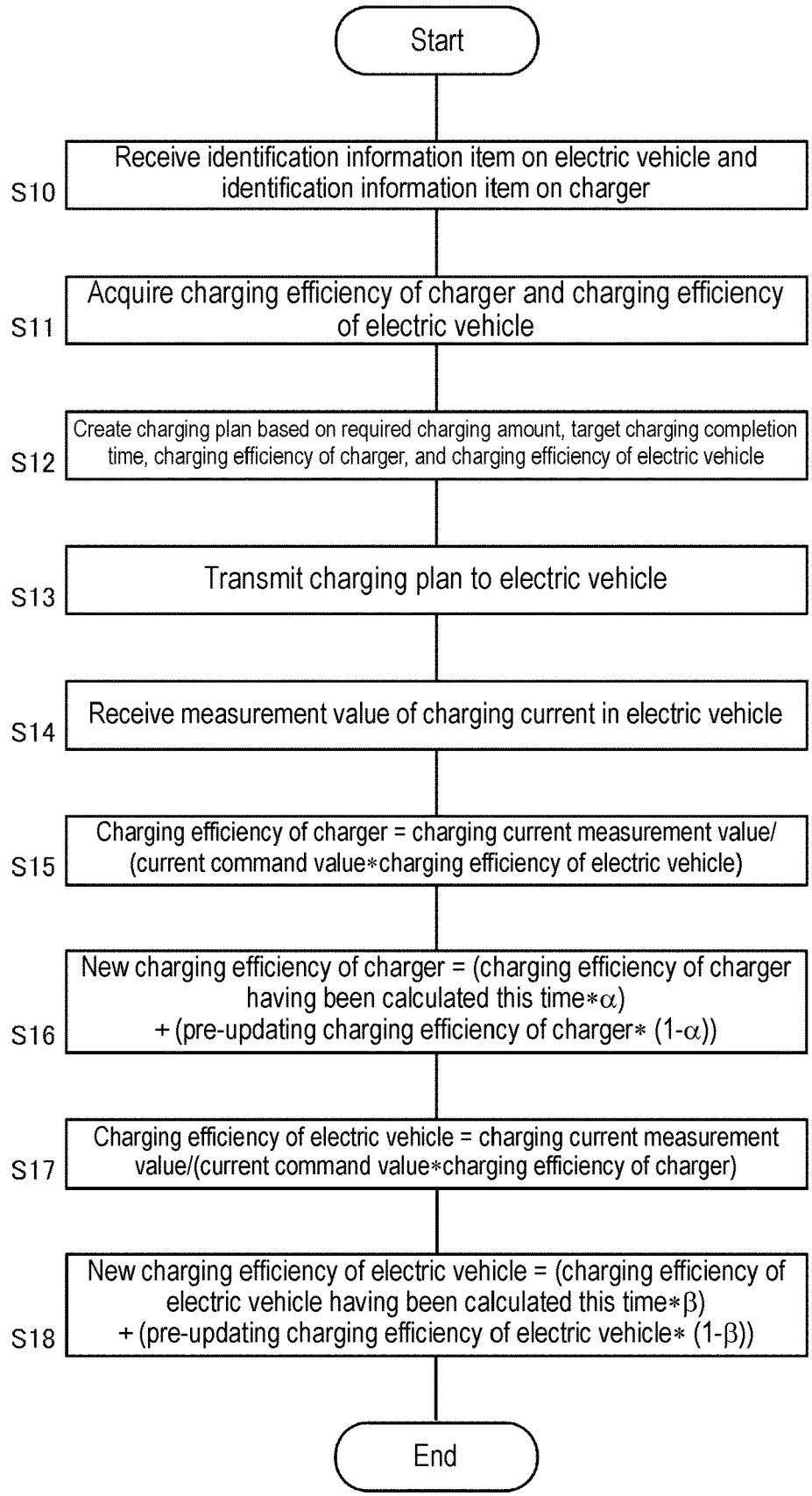
FIG. 6 is a flowchart showing an example of a process of creating a charging plan and updating a charging efficiency, the process being executed by the management system according to the exemplary embodiment.

FIG. 6 is a flowchart showing an example of a process of creating a charging plan and updating a charging efficiency, the process being executed by management system 1 according to the exemplary embodiment. Communication unit 113 of management system 1 receives an identification information item on electric vehicle 3 and an identification information item on charger 4 from electric vehicle 3 connected to charger 4, via network 2 (S10). Based on the received identification information item on charger 4, creating unit 111 refers to charger information holding unit 121 to acquire a charging efficiency of charger 4. Based on the received identification information item on electric vehicle 3, creating unit 111 refers to vehicle information holding unit 122 to acquire a charging efficiency of electric vehicle 3 (S11).

Creating unit 111 creates a charging plan with the charging efficiency of charger 4 and the charging efficiency of electric vehicle 3. Creating unit 111, as described above, creates the charging plan based on a required charging amount and a target charging completion time, and corrects a current rate set in the created charging plan, by multiplying the current rate by the reciprocal of the charging efficiency of charger 4 and the reciprocal of the charging efficiency of electric vehicle 3 (S12). Communication unit 113 transmits the charging plan including the corrected current rate, to electric vehicle 3 via network 2 (S13).

Upon receiving the charging plan including the current rate, vehicle controller 30 of electric vehicle 3 transmits the current rate as a current command value, to charger 4 via the communication line in charging cable 38. Vehicle controller 30 turns on second relay RY2. Charger 4 supplies power to electric vehicle 3 at the current rate specified by the current command value.

During charging, vehicle controller 30 of electric vehicle 3 acquires the measurement value of a charging current flowing through power storage unit 41 and the measurement value of a charging voltage applied to power storage unit 41, from power storage controller 46. When the acquired charging voltage value reaches a voltage corresponding to a target SOC included in the charging plan, vehicle controller 30 turns off second relay RY2 to end the charging.

During the charging, vehicle controller 30 transmits the acquired charging current measurement value to management system 1 via network 2. Communication unit 113 of management system 1 receives the charging current measurement value transmitted from electric vehicle 3 (S14).

Updating unit 112 calculates the charging efficiency of charger 4 connected to electric vehicle 3, based on the current command value included in the charging plan, the charging current measurement value, and the charging efficiency of electric vehicle 3 (S15). Specifically, the charging efficiency of charger 4 is calculated by (Equation 1) shown below. It is desirable that an average of a plurality of charging current measurement values that are taken in a given period in which the current command value remains unchanged be used as the charging current measurement value.

$$\text{Charging efficiency of charger 4} = \text{charging current measurement value}/(\text{current command value}*\text{charging efficiency of electric vehicle 3}) \quad \text{(Equation 1)}$$

When the charging efficiency of electric vehicle 3 is unknown, the charging efficiency of charger 4 can be calculated, using the following (Equation 2) to (Equation 4).

$$\text{Charging current measurement value 1(known)} = \text{charging efficiency of charger } A \text{ (unknown)} * \text{charging efficiency of electric vehicle } A(\text{unknown}) * \text{current command value 1(known)} \quad \text{(Equation 2)}$$

$$\text{Charging current measurement value 2(known)} = \text{charging efficiency of charger } B \text{ (known)} * \text{charging efficiency of electric vehicle } A(\text{unknown}) * \text{current command value 2 (known)} \quad \text{(Equation 3)}$$

$$\text{Charging efficiency of charger } A(\text{unknown}) = (\text{charging current measurement value 1(known)} * \text{charging efficiency of charger } B(\text{known}) * \text{current command value 2 (known)})/\text{charging current measurement value 2(known)} * \text{current command value 1 (known)} \quad \text{(Equation 4)}$$

Electric vehicle A and charger A represent electric vehicle 3 and charger 4 that are involved in the current charging process. Charger B is one of chargers 4 that electric vehicle A used in the past. Charger B may be, for example, charger 4 installed in an office and used most frequently by electric vehicle A, or may be charger 4 used most recently to charge electric vehicle A.

Current command value 1 represents a current command value used in the current charging process, and charging current measurement value 1 represents a charging current measured in the current charging process. Current command value 2 represents a current command value used in a charging process using charger B, and charging current measurement value 2 represents a charging current measured in the charging process using charger B.

When the charging efficiency of charger 4 is calculated using the above (Equation 2) to (Equation 4), it is necessary to hold current command value 2 and charging current measurement value 2 as a charging efficiency calculation history, in recording unit 12 of management system 1 or in the nonvolatile memory of vehicle controller 30 of electric vehicle 3 for a given period.

Updating unit 112 reads a charging efficiency of charger 4 held in charger information holding unit 121, and calculates a new charging efficiency of charger 4, based on the read charging efficiency that is the pre-updating charging efficiency and on the charging efficiency of charger 4 having been calculated this time. Updating unit 112 updates the charging efficiency of charger 4 held in charger information holding unit 121, with the newly calculated charging efficiency (S16). Specifically, the new charging efficiency of charger 4 is calculated by using the following (Equation 5).

$$\text{New charging efficiency of charger 4} = (\text{charging efficiency of charger 4 having been calculated this time} * \alpha(0 < \alpha \leq 1)) + (\text{pre-updating charging efficiency of charger 4} * (1-\alpha)) \quad \text{(Equation 5)}$$

Setting $\alpha=1$ results in a process of replacing the existing charging efficiency of charger 4 with the charging efficiency of the charger 4 having been calculated this time. $\alpha$ being smaller than 1 results in a moving average process in which the charging efficiency value having been calculated this time contributes less as $\alpha$ gets closer to 0. Because the charging efficiency of charger 4 depends also on environmental conditions, such as temperature, the charging efficiency should desirably be updated by the moving average process, based on a plurality of pieces of sample data. The equation may be manipulated such that as the interval between the current date of calculation and the previous date of calculation gets longer, $\alpha$ is brought closer to 1 to increase the degree of contribution of the charging efficiency value having been calculated this time.

Updating unit 112 calculates the charging efficiency of electric vehicle 3, based on the current command value included in the transmitted charging plan, the received charging current measurement value, and the charging efficiency of charger 4 connected to electric vehicle 3 (S17). Specifically, the charging efficiency of electric vehicle 3 is calculated by the following (Equation 6).

$$\text{Charging efficiency of electric vehicle 3} = \text{charging current measurement value}/(\text{current command value}*\text{charging efficiency of charger 4}) \quad \text{(Equation 6)}$$

When the charging efficiency of charger 4 is unknown, the charging efficiency of electric vehicle 3 can be calculated using the following (Equation 7) to (Equation 9).

$$\text{Charging current measurement value 1(known)} = \text{charging efficiency of electric vehicle } A(\text{unknown}) * \text{charging efficiency of charger } A(\text{unknown}) * \text{current command value 1(known)} \quad \text{(Equation 7)}$$

$$\text{Charging current measurement value 2(known)} = \text{charging efficiency of electric vehicle } B(\text{known}) * \text{charging efficiency of charger } A(\text{unknown}) * \text{current command value 2(known)} \quad \text{(Equation 8)}$$

$$\text{Charging efficiency of electric vehicle } A(\text{unknown}) = \text{charging current measurement value 1(known)} * \text{charging efficiency of electric vehicle } B(\text{known}) * \text{current command value 2(known)}/\text{charging current measurement value 2(known)} * \text{current command value 1(known)} \quad \text{(Equation 9)}$$

Electric vehicle A and charger A represent electric vehicle 3 and charger 4 that are involved in the current charging process. Electric vehicle B represents one of electric vehicles 3 that were charged with charger A in the past. Electric vehicle B may be, for example, electric vehicle 3 charged most frequently with charger A, or electric vehicle 3 charged most recently with charger A.

Current command value 1 represents a current command value used in the current charging process, and charging current measurement value 1 represents a charging current measured in the current charging process. Current command value 2 represents a current command value that is used when electric vehicle B is charged, and charging current measurement value 2 represents a charging current that is measured when electric vehicle B is charged.

When the charging efficiency of electric vehicle 3 is calculated using the above (Equation 7) to (Equation 9), it is necessary to hold current command value 2 and charging current measurement value 2 as a charging efficiency calculation history, in recording unit 12 of management system 1 or in the nonvolatile memory of vehicle controller 30 of electric vehicle 3 for a given period.

Updating unit 112 reads a charging efficiency of electric vehicle 3 that is the target vehicle, the charging efficiency being held in vehicle information holding unit 122, and calculates a new charging efficiency of electric vehicle 3, based on the read charging efficiency that is the pre-updating charging efficiency and on the charging efficiency of electric vehicle 3 having been calculated this time. Updating unit 112 updates the charging efficiency of electric vehicle 3 held in vehicle information holding unit 122, with the newly calculated charging efficiency (S18). Specifically, the new charging efficiency of electric vehicle 3 is calculated by the following (Equation 10).

New charging efficiency of electric vehicle 3=(charging efficiency of electric vehicle 3 having been calculated this time*β(0<β≤1))+(pre-updating charging efficiency of electric vehicle 3*(1−β))  (Equation 10)

Setting β=1 results in a process of replacing the existing charging efficiency of electric vehicle 3 with the charging efficiency of electric vehicle 3 having been calculated this time. β being smaller than 1 results in a moving average process in which the charging efficiency value having been calculated this time contributes less as β gets closer to 0. Because the charging efficiency of electric vehicle 3 depends also on environmental conditions, such as temperature, the charging efficiency should desirably be updated by the moving average process, based on a plurality of pieces of sample data. The equation may be manipulated such that as the interval between the current date of calculation and the previous date of calculation gets longer, β is brought closer to 1 to increase the degree of contribution of the charging efficiency value having been calculated this time.

With reference to the above (Equation 1) to (Equation 4) and (Equation 5) to (Equation 9), examples of calculating the charging efficiency of charger 4 and the charging efficiency of electric vehicle 3 on the basis of the current command value and the charging current measurement value have been described. In this calculation process, a power command value and a charging power measurement value may be used in place of the current command value and the charging current measurement value. A depth of discharge (DOD) may also be used.

Figure 7:
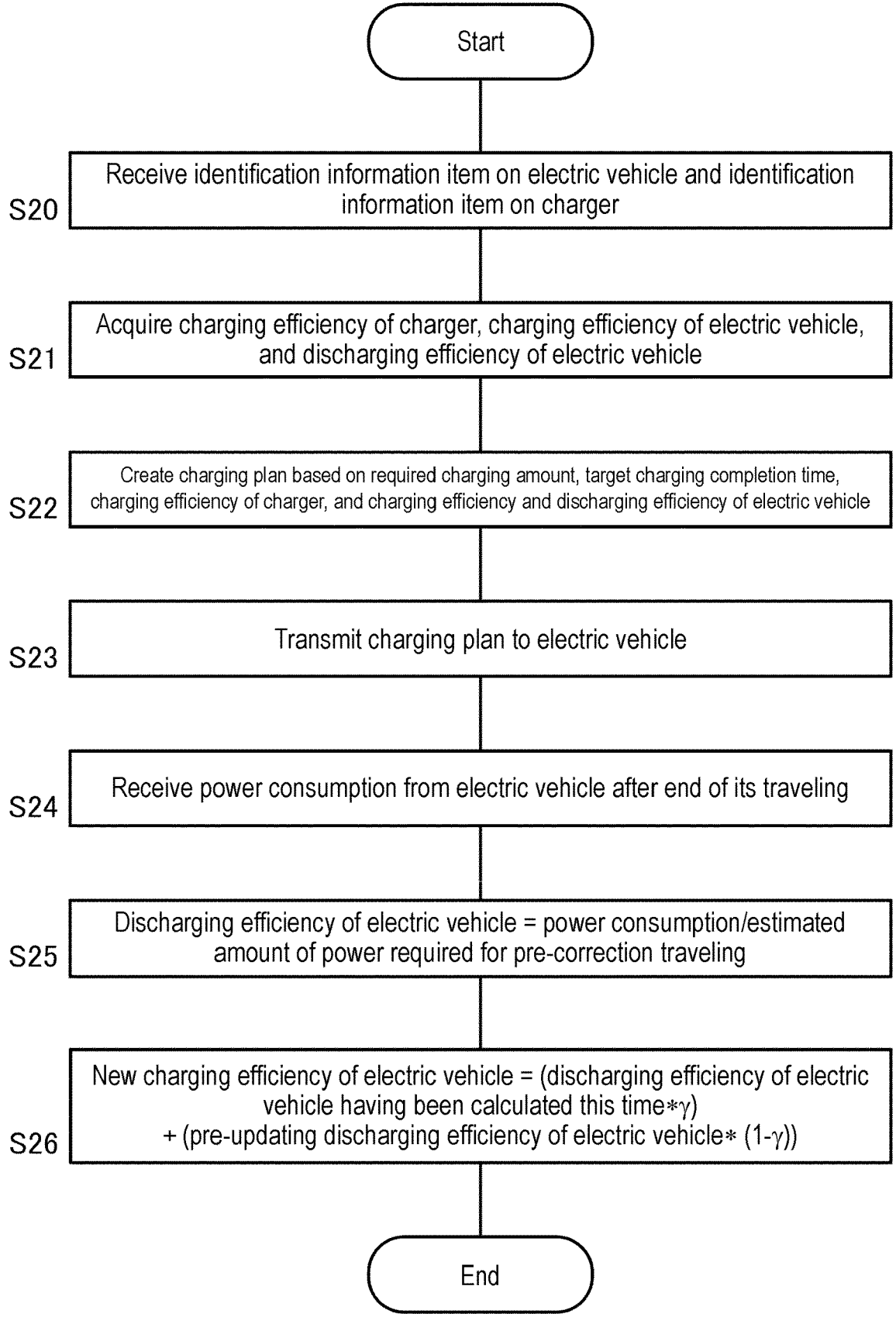
FIG. 7 is a flowchart showing an example of a process of creating a charging plan and updating a discharging efficiency, the process being executed by the management system according to the exemplary embodiment.

FIG. 7 is a flowchart showing an example of a process of creating a charging plan and updating a discharging efficiency, the process being executed by management system 1 according to the exemplary embodiment. Communication unit 113 of management system 1 receives an identification information item on electric vehicle 3 and an identification information item on charger 4 from electric vehicle 3 connected to charger 4, via network 2 (S20). Based on the received identification information item on charger 4, creating unit 111 refers to charger information holding unit 121 to acquire a charging efficiency of charger 4. Based on the received identification information item on electric vehicle 3, creating unit 111 refers to vehicle information holding unit 122 to acquire a charging efficiency and a discharging efficiency of electric vehicle 3 (S21).

Creating unit 111 creates a charging plan with the charging efficiency of charger 4, the charging efficiency of electric vehicle 3, and the discharging efficiency of electric vehicle 3. Creating unit 111, as described above, creates a charging plan based on a required charging amount and a target charging completion time. Creating unit 111 corrects an amount of power required for traveling, by multiplying an amount of power required for traveling a scheduled delivery route, the amount of power being the basis of calculation of the required charging amount, by the reciprocal of the discharging efficiency of electric vehicle 3. In addition, creating unit 111 corrects a current rate set in the created charging plan, by multiplying the current rate by the reciprocal of the charging efficiency of charger 4 and the reciprocal of the charging efficiency of electric vehicle 3 (S22). Communication unit 113 transmits the charging plan including the corrected current rate, to electric vehicle 3 via network 2 (S23).

Upon receiving the charging plan including the current rate, vehicle controller 30 of electric vehicle 3 transmits the current rate as a current command value, to charger 4 via the communication line in charging cable 38. Vehicle controller 30 turns on second relay RY2. Charger 4 supplies power to electric vehicle 3 at the current rate specified by the current command value.

During charging, vehicle controller 30 of electric vehicle 3 acquires the measurement value of a charging current flowing through power storage unit 41 and the measurement value of a charging voltage applied to power storage unit 41, from power storage controller 46. When the acquired charging voltage value reaches a voltage corresponding to a target SOC included in the charging plan, vehicle controller 30 turns off second relay RY2 to end the charging.

When the vehicle having finished delivery returns to the office, vehicle controller 30 transmits power consumption representing an amount of power consumed in the current delivery work, to management system 1 via network 2. Communication unit 113 of management system 1 receives the power consumption transmitted from electric vehicle 3 (S24).

Updating unit 112 calculates a discharging efficiency of electric vehicle 3, based on an amount of power required for pre-correction traveling, the amount of power being estimated at the time of creating the charging plan, and on the received power consumption (S25). Specifically, the discharging efficiency of electric vehicle 3 is calculated by the following (Equation 11).

Discharging efficiency of electric vehicle 3=power consumption/estimated amount of power required for pre-correction traveling  (Equation 11)

Updating unit 112 reads a discharging efficiency of electric vehicle 3 that is the target vehicle, the discharging efficiency being held in vehicle information holding unit 122, and calculates a new discharging efficiency of electric vehicle 3, based on the read discharging efficiency that is the pre-updating discharging efficiency and on the discharging efficiency of electric vehicle 3 having been calculated this time. Updating unit 112 updates the discharging efficiency of electric vehicle 3 held in vehicle information holding unit 122, with the newly calculated discharging efficiency (S26). Specifically, the new discharging efficiency of electric vehicle 3 is calculated by the following (Equation 12).

New discharging efficiency of electric vehicle 3=(discharging efficiency of electric vehicle 3 having calculated this time*γ(0<γ≤1))+(pre-updating discharging efficiency of electric vehicle 3*(1−γ))  (Equation 12)

Setting γ=1 results in a process of replacing the existing discharging efficiency of electric vehicle 3 with the discharging efficiency of electric vehicle 3 having been calculated this time. γ being smaller than 1 results in a moving average process in which the discharging efficiency value having been calculated this time contributes less as γ gets closer to 0. Because the discharging efficiency of electric vehicle 3 depends also on environmental conditions, such as temperature, the discharging efficiency should desirably be updated by the moving average process, based on a plurality of pieces of sample data. The equation may be manipulated such that as the interval between the current date of calculation and the previous date of calculation gets longer, γ is brought closer to 1 to increase the degree of contribution of the discharging efficiency value having been calculated this time.

Figure 8:
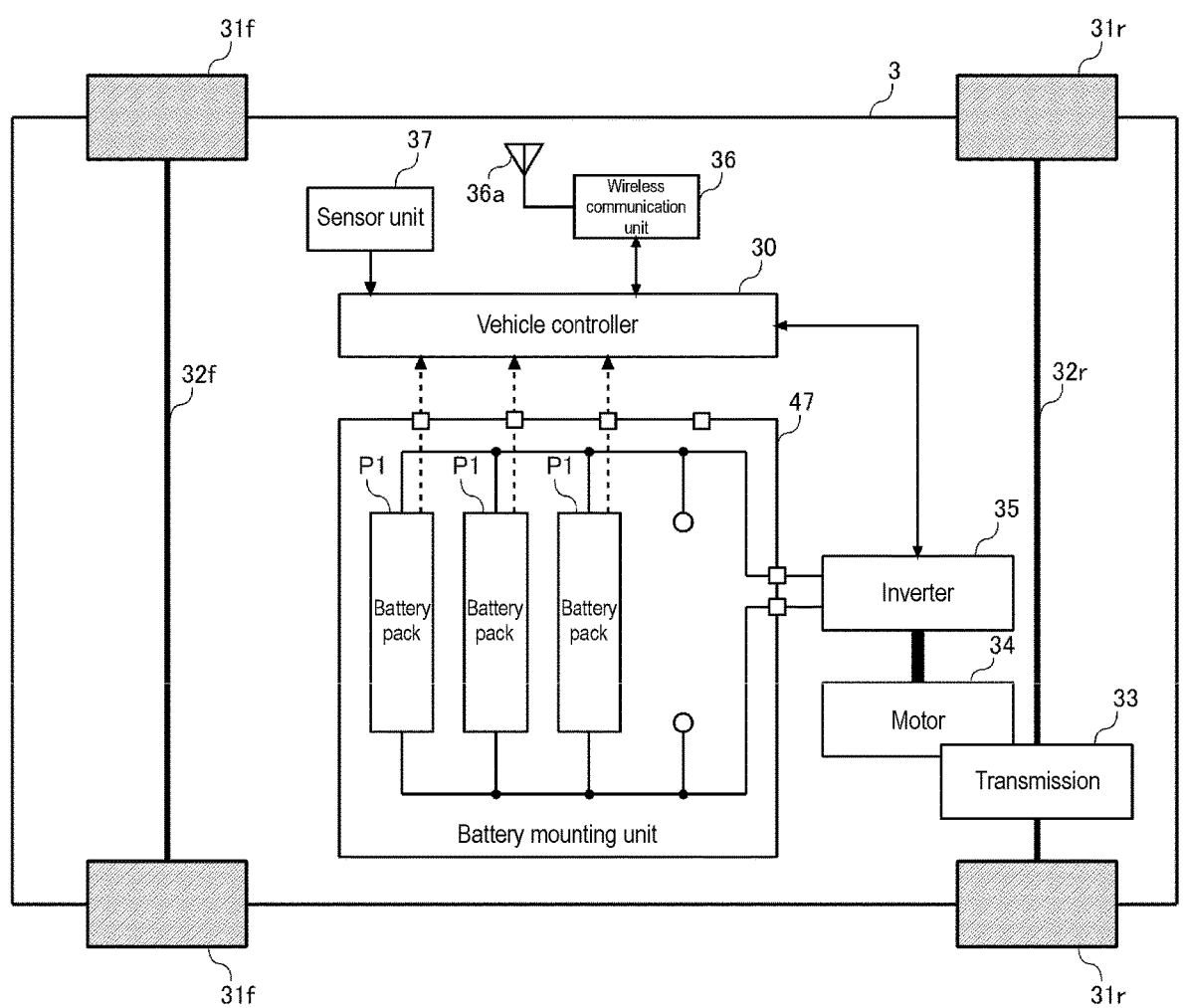
FIG. 8 depicts a schematic configuration of an electric vehicle according to a modification.

FIG. 8 depicts a schematic configuration of electric vehicle 3 according to a modification. Electric vehicle 3 according to the modification is an electric vehicle equipped with detachable/replaceable battery pack P1 serving as a power source. Compared with electric vehicle 3 with full-spec capability, this electric vehicle 3 has lower power output and is limited in occupant capacity and maximum speed. Electric vehicle 3 according to the modification includes battery mounting unit 47 in which battery packs P1 are placed. Battery mounting unit 47 has a plurality of mounting slots. The plurality of battery packs P1 fitted in the plurality of mounting slots are connected in parallel with each other. The greater the number of battery packs P1 placed in the battery mounting unit 47 is, the higher the battery capacity becomes.

As described above, according to this exemplary embodiment, the charging plan is created with the charging efficiency of charger 4 and the charging efficiency of electric vehicle 3. A charging plan contributing to suppression of degradation of the secondary battery, therefore, can be created meticulously with high accuracy. In a case where a shift between the charging plan and the actual time transition of charging exists, correction for eliminating the shift is required in the next charging process and other charging processes to follow. However, because charger 4 and electric vehicle 3 have their unique charging efficiencies, respectively, using a different unit of charger 4 or electric vehicle 3 in each charging process leads to a problem that the shift is not eliminated. In particular, a vehicle for delivery business needs to be charged in the middle of its delivery work in many cases, in which various types of chargers 4 are expected to be used.

According to this exemplary embodiment, the charging efficiency of charger 4 and the charging efficiency of electric vehicle 3 are collectively managed by the database of management system 1. By accessing management system 1 at the time of charging electric vehicle 3, therefore, the shift between the charging plan and the actual time transition of charging can be reduced. Reducing the shift allows creation of a charging plan that contributes to suppression of degradation of the secondary battery.

In addition, the charging efficiency of charger 4 and the charging efficiency of electric vehicle 3 are updated in each charging process. As a result, the charging efficiency of charger 4 and the charging efficiency of electric vehicle 3 can be kept at the optimum charging efficiency value. Even if a different unit of charger 4 or electric vehicle 3 is used in each charging process, therefore, a highly accurate charging plan can be created constantly. In a case where charger 4 is a charger used for a certain unit of electric vehicle 3 for the first time, if this charger 4 has already been used to charge a different unit of electric vehicle 3, a highly accurate charging plan can be created by accessing management system 1.

By collectively managing the discharging efficiencies of electric vehicles 3 by the database of management system 1, the secondary battery can be charged with the optimal amount of power with little excess or deficiency. Collective discharging efficiency management is particularly effective for an application in which, as indicated in FIG. 8, combinations of electric vehicle 3 and the secondary battery vary. A proper charging plan can be created according to the discharging efficiency of electric vehicle 3 in which the secondary battery is incorporated. By updating the discharging efficiency of electric vehicle 3 for each delivery work, the discharging efficiency of electric vehicle 3 can be kept at the optimum discharge efficiency value. Discharging efficiency updating can also be used for the purpose of identifying electric vehicle 3 whose discharging efficiency is declining. This also allows management of vehicle maintenance periods and tire replacement periods.

According to this exemplary embodiment, management system 1 manages the charging efficiency of charger 4, the charging efficiency of electric vehicle 3, and the discharging efficiency of electric vehicle 3, and creates the charging plan. This reduces the load on vehicle controller 30 of electric vehicle 3. Software for vehicle controller 30 of electric vehicle 3 is updated less frequently, and adding functions is achieved in most cases by merely updating software for management system 1. Hence actual implementation of the system is easy.

The present disclosure has been described above according to the exemplary embodiment. It will be understood by those who are skilled in art that the exemplary embodiment is merely an example, that combinations of constituent elements and processes included in the exemplary embodiment may be modified in various forms, and that such modifications are also within the scope of the present disclosure.

In the above-described exemplary embodiment, the case of the delivery vehicle having the delivery plan to follow has been described. The present disclosure may also be applied to services with an undetermined traveling distance, such as a car-sharing service. In such a case, the target SOC in the charging plan may be set as the upper limit value of the SOC use range.

The exemplary embodiment may be specified by the following items.

[Item 1]

Management system (1) includes:

charger information holding unit (121) that holds an identification information item and a charging efficiency of each of a plurality of chargers (4), the identification information item and the charging efficiency being associated with each other;

communication unit (113) that, from electric vehicle (3) connected to charger (4), receives an identification information item on charger (4) via network (2); and creating unit (111) that creates a charging plan for electric vehicle (3), based on a required charging amount and a target charging termination time, wherein creating unit (111) refers to charger information holding unit (121) and specifies a charging efficiency of charger (4) connected to electric vehicle (3), based on the received identification information item, and creates a charging plan in which the charging efficiency of charger (4) is taken into consideration, and communication unit (113) sends the created charging plan to electric vehicle (3) via network (2).

According to Item 1, a highly accurate charging plan in which the charging efficiency of connected charger (4) is taken into consideration can be created.

[Item 2]

Management system (1) according to Item 1, further including vehicle information holding unit (122) that holds an identification information item and a charging efficiency of each of a plurality of electric vehicles (3), the identification information item and the charging efficiency being associated with each other, wherein communication unit (113) receives an identification information item on electric vehicle (3) from electric vehicle (3) connected to charger (4), via network (2), and creating unit (111) refers to vehicle information holding unit (122) and specifies a charging efficiency of electric vehicle (3), based on the received identification information item on electric vehicle (3), and creates a charging plan in which a charging efficiency of charger (4) and the charging efficiency of electric vehicle (3) are taken into consideration.

According to Item 2, a highly accurate charging plan in which the charging efficiency of connected charger (4) and the charging efficiency of electric vehicle (3) are taken into consideration can be created.

[Item 3]

Management system (1) according to Item 2, wherein communication unit (113) receives a measurement value of a charging current or charging power in electric vehicle (3) connected to charger (4), via network (2), and management system (1) further includes updating unit (112) that calculates a charging efficiency of charger (4), based on a current command value or a power command value included in a charging plan transmitted to electric vehicle (3), on the measurement value of the charging current or of the charging power, and on a charging efficiency of electric vehicle (3), and updates a charging efficiency of charger (4) held in charger information holding unit (121), based on the calculated charging efficiency.

According to Item 3, the charging efficiency of charger (4) can be kept at an optimum value.

[Item 4]

Management system (1) according to Item 3, wherein updating unit (112) calculates a charging efficiency of electric vehicle (3), based on a current command value or a power command value included in a charging plan transmitted to electric vehicle (3), on the measurement value of the charging current or of the charging power, and on a charging efficiency of charger (4) connected to electric vehicle (3), and updates a charging efficiency of electric vehicle (3) held in vehicle information holding unit (122), based on the calculated charging efficiency.

According to Item 4, the charging efficiency of electric vehicle (3) can be kept at an optimum value.

[Item 5]

Management system (1) according to Item 3 or 4, wherein vehicle information holding unit (122) further holds an identification information item and a discharging efficiency of each of the plurality of electric vehicles (3), the identification information item and the discharging efficiencies being associated with each other, communication unit (113) receives an identification information item on electric vehicle (3) and power consumption representing an amount of power consumed for traveling, from electric vehicle (3) to which the charging plan has been transmitted, via network (2), and updating unit (112) calculates a discharging efficiency of electric vehicle (3), based on an amount of power required for traveling, the amount of power being estimated when a charging plan having been transmitted to electric vehicle (3) is created, and on the power consumption, and updates a discharging efficiency of electric vehicle (3) held in vehicle information holding unit (122), based on the calculated discharging efficiency.

According to Item 5, the discharging efficiency of electric vehicle (3) can be kept at an optimum value.

[Item 6]

Management system (1) according to Item 5, wherein creating unit (111) refers to vehicle information holding unit (122) and specifies a discharging efficiency of electric vehicle (3), based on an identification information item on electric vehicle (3) connected to charger (4), and creates a charging plan in which the discharging efficiency of electric vehicle (3) is taken into consideration.

According to Item 6, a highly accurate charging plan in which the discharging efficiency of electric vehicle (3) is taken into consideration can be created.

[Item 7]

Management system (1) according to any one of Items 1 to 6, wherein power storage unit (41) incorporated in electric vehicle (3) is detachable.

According to Item 7, even if a combination of electric vehicle (3) and power storage unit (41) changes, a highly accurate charging plan can be created.

[Item 8]

A management program causing a computer to execute the processes of:

receiving an identification information item on charger (4) from electric vehicle (3) connected to charger (4), via network (2);

referring to charger information holding unit (121) that holds an identification information item and a charging efficiency of each of a plurality of chargers (4), the identification information item and the charging efficiencies being associated with each other, and specifying a charging efficiency of charger (4) connected to electric vehicle (3), based on the received identification information item;

creating a charging plan for electric vehicle (3), based on a required charging amount, a target charging termination time, and the charging efficiency of charger (4); and transmitting the created charging plan to electric vehicle (3) via network (2).

According to Item 8, a highly accurate charging plan in which the charging efficiency of connected charger (4) is taken into consideration can be created.

[Item 9]

Electric vehicle (3) including:

motor (34);

power storage unit (41) that supplies power to motor (34); and controller (30) that communicates with management system (1) according to any one of Items 1 to 7 to control a process of charging power storage unit (41) by charger (4).

According to Item 9, highly accurate charging in which the charging efficiency of connected charger (4) is taken into consideration can be carried out.

REFERENCE MARKS IN THE DRAWINGS 1 management system
2 network
3 electric vehicle
4 charger
5 commercial power system
11 processor
111 creating unit
112 updating unit
113 communication unit
12 recording unit
121 charger information holding unit
122 vehicle information holding unit
123 degradation map holding unit
124 calculation history holding unit
30 vehicle controller 31f front wheel
31r rear wheel
32f front wheel axle
32r rear wheel axle
33 transmission
34 motor
35 inverter
36 wireless communication unit
36a antenna
37 sensor unit
371 vehicle speed sensor
372 GPS sensor
373 gyro sensor
38 charging cable
40 power supply system
41 power storage unit
42 management unit
43 voltage measurement unit
44 temperature measurement unit
45 current measurement unit
46 power storage controller
47 battery mounting unit
E1, E2, En cell
RY1 first relay
RY2 second relay
T1 first temperature sensor
T2 second temperature sensor
Rs shunt resistor
P1 battery pack

The invention claimed is:

1. A management system comprising:
a processor, which is hardware; and
one or more memories that function as a charger information holding unit that holds an identification information item and a charging efficiency of each of a plurality of chargers for charging electric vehicles, the identification information item and the charging efficiency being associated with each other,
the processor is programmed to perform:
receiving from an electric vehicle via a network using a wireless communication, an identification information item of a charger currently connected to the electric vehicle among the plurality of chargers;
determining a charging efficiency of the charger from the charger information holding unit based on the identification information item received from the electric vehicle;
creating a charging plan for the electric vehicle, based on a required charging amount, a target charging termination time and the charging efficiency of the charger, the charging plan comprising a charging current and a duration time of the charging current; and
transmitting the charging plan to the electric vehicle via the network to charge a power storage unit incorporated in the electric vehicle in accordance with the charging plan.

2. The management system according to claim 1, wherein:
the one or more memories further function as a vehicle information holding unit that holds an identification information item of each of a plurality of electric vehicles including the electric vehicle and a charging efficiency of each of a plurality of the electric vehicles in association with each other, and
the processor is further programmed to perform:
receiving an identification information item on the electric vehicles, from the electric vehicle connected to the charger, via the network,
determining, by referring to the vehicle information holding unit, a charging efficiency of the electric vehicle, based on the identification information item received on the electric vehicle, and
creating the charging plan based on the required charging amount, the target charging termination time, the charging efficiency of the charger and the charging efficiency of the electric vehicle.

3. The management system according to claim 2, wherein the processor is further programmed to perform:
receiving a measurement value of a charging current or charging power in the electric vehicle connected to the charger, via the network,
calculating the charging efficiency of the charger, based on a current command value or a power command value included in the charging plan transmitted to the electric vehicle, on the measurement value of the charging current or of the charging power, and on the charging efficiency of the electric vehicle, and
updating the charging efficiency of the charger held in the charger information holding unit, based on the charging efficiency calculated.

4. The management system according to claim 3, wherein the processor is further programmed to perform:
calculating the charging efficiency of the electric vehicle, based on the current command value or the power command value included in the charging plan transmitted to the electric vehicle, on the measurement value of the charging current or of the charging power, and on the charging efficiency of the charger connected to the electric vehicle, and
updating the charging efficiency of the electric vehicle held in the vehicle information holding unit, based on the charging efficiency calculated.

5. The management system according to claim 3, wherein:
the vehicle information holding unit further holds a discharging efficiency of each of the plurality of electric vehicles, the identification information item of each of the plurality of electric vehicles and the discharging efficiencies being associated with each other, and
the processor is further programmed to perform:
receiving the identification information item on the electric vehicle and power consumption representing an amount of power consumed for traveling, from the electric vehicle to which the charging plan has been transmitted, via the network,
calculating a discharging efficiency of the electric vehicle, based on an amount of power required for traveling, the amount of power being estimated while the charging plan having been transmitted to the electric vehicle is created, and on the power consumption, and
updating the discharging efficiency of the electric vehicle held in the vehicle information holding unit, based on the discharging efficiency calculated.

6. The management system according to claim 5, wherein the processor is further programmed to perform:
 determining, by referring to the vehicle information holding unit, the discharging efficiency of the electric vehicle, based on the identification information item on the electric vehicle connected to the charger, and creating a charging plan with the discharging efficiency of the electric vehicle.

7. The management system according to claim 1, wherein the power storage unit incorporated in the electric vehicle is detachable.

8. A method executed by a computer, comprising:
 receiving an identification information item on a charger from an electric vehicle connected to the charger, via a network using a wireless communication;
 determining a charging efficiency of the charger connected to the electric vehicle, based on the identification information item received from the electric vehicle, by referring to a charger information holding unit that holds an identification information item and charging efficiency of each of a plurality of chargers, the identification information item and the charging efficiency being associated with each other;
 creating a charging plan for the electric vehicle, based on a required charging amount, a target charging termination time, and the charging efficiency of the charger, the charging plan comprising a charging current and a duration time of the charging current; and
 transmitting the charging plan created to the electric vehicle via the network to charge a power storage unit incorporated in the electric vehicle in accordance with the charging plan.

9. An electric vehicle comprising:
 a motor;
 a power storage unit that supplies power to the motor; and
 a controller that communicates with the management system according to claim 1 to control a process of charging the power storage unit by the charger.

10. The method of claim 8, further comprising charging the power storage unit of the electric vehicle in accordance with the charging plan.

11. A system comprising:
 a management system; and
 a plurality of electric vehicles, wherein:
 the management system includes:
  a processor; and
  one or more memories that function as a charger information holding unit that holds an identification information item and a charging efficiency of each of a plurality of chargers for charging the plurality of electric vehicles, the identification information item and the charging efficiency being associated with each other,
 the processor is programmed to perform:
  receiving from an electric vehicle among the plurality of electric vehicles via a network using a wireless communication, an identification information item of a charger currently connected to the electric vehicle among the plurality of chargers;
  determining a charging efficiency of the charger from the charger information holding unit based on the identification information item received from the electric vehicle;
  creating a charging plan for the electric vehicle, based on a required charging amount, a target charging termination time and the charging efficiency of the charger, the charging plan comprising a charging current and a duration time of the charging current; and
  transmitting the charging plan to the electric vehicle via the network, and the electric vehicle includes:
 a motor;
 a power storage unit that supplies power to the motor; and
 a controller that communicates with the management system and control a process of charging the power storage unit by the charger in accordance with the charging plan.

12. The system of claim 11, further comprising one or more of the plurality of chargers.

* * * * *